Patented Sept. 5, 1950

2,521,366

UNITED STATES PATENT OFFICE 2,521,366

INSECTICIDAL AND SYNERGISTIC PRODUCTS

Oscar F. Hedenburg, Pittsburgh, Pa., assignor, by mesne assignments, to Rex Research Corporation, Toledo, Ohio, a corporation of Delaware No Drawing. Application April 22, 1949, Serial No. 89,160

15 Claims. (Cl. 167—24)

This invention relates to the production of certain chemical products or organic compounds, and to compositions of the products or compounds with pyrethrins for which they are synergists.

In a preferred embodiment of my invention I form the compounds by reacting together and at an elevated temperature, an alcohol, safrole and paraformaldehyde in the presence of a catalyst to depolymerize the paraformaldehyde and aid in the reaction of formaldehyde with the alcohol and safrole. The alcohols are the alkoxyethyl alcohols (R—O—CH$_2$—CH$_2$—OH) and alkoxyethoxyethyl alcohols (R—O—CH$_2$—CH$_2$—O—CH$_2$—CH$_2$—OH)

where R is an alkyl group having from 1 to 4 carbon atoms.

The compounds may be made by reacting all three of the constituents together, or by first reacting either the alcohol, or safrole, with paraformaldehyde and then adding the third constituent. The alcohol and safrole may also be reacted separately with paraformaldehyde and then these products reacted together with the catalyst present.

As catalysts, I have used toluenesulfonic acid, benzene sulfonic acid or naphthalene sulfonic acid. Other strong non-volatile acids, such as sulfuric acid, sodium acid sulfate, trichloroacetic acid and monoethylphosphoric acid, may also be used.

The reaction may be performed in benzene solution, or the constituents may be heated together, with a catalyst in the former case the benzene solution may be boiled to remove water formed in the reaction and concentrated by distilling off the benzene, or the benzene solution may be washed to remove acid before recovering the product. The benzene solution may also be added to absorbent carriers, such as pyrophyllite, and the benzene evaporated.

When the constituents are heated together the product may be used directly by incorporating in carriers with or without neutralizing the acid catalyst remaining as may be found desirable. The product may be dissolved in benzene or other suitable solvent and washed free from acid for some uses and the benzene removed at reduced pressure.

Water is formed in the reaction which may be removed by known methods or allowed to remain when the product is combined with absorbent carriers.

The reaction involves the use of one mol of alcohol, one mol of safrole and two mols of formaldehyde, to produce the new compounds as shown graphically by the following equation:

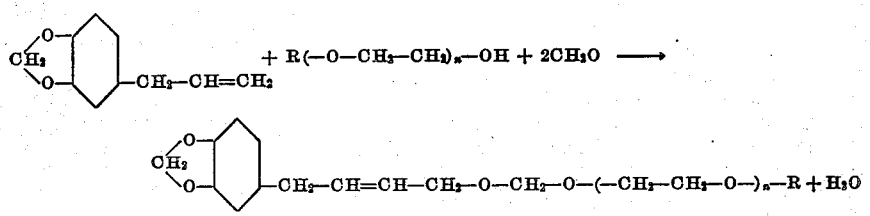

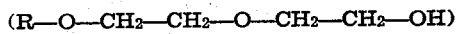

in which R is an alkyl radical having from one to four carbon atoms and $n$ is an integer from one to two.

In the preparations below there was usually used one half-mol each of the alcohol and safrole and one mol of formaldehyde or an equivalent quantity of paraformaldehyde (called a "one-half mol batch") and was carried out in a 500 cc. 3-neck flask with a thermometer in a cork in one small neck, a cork in the other small neck and a vertical condenser attached to the central neck. The batch was stirred while the temperature was rising and until most of the paraformaldehyde was dissolved, solution of the paraformaldehyde taking place quite rapidly—about 10 minutes in some examples. The temperature was then kept as uniform as possible during the test.

Some wash waters were tested for formaldehyde and showed that in some cases 5 to 10 per cent of the paraformaldehyde used was unreacted, which may be partly accounted for because the safrole used was probably 90 to 95% pure.

The water that was formed collected partly as a separate layer, or remained mostly dissolved in the product from some alcohols. In the case of products from butoxyethyl alcohol and butoxyethoxyethyl alcohol, water collected as a pool at the bottom and could be drawn off in large scale operation.

The insecticidal and synergistic tests given below for each example were made with houseflies in comparison with the O. T. I. which means the Official Test Insecticide (100 mg. of pyrethrins dissolved in 100 ml. of petroleum distillate). The comparison is given as the O. T. I. difference between the 24-hour kill for the sample and the 24-hour kill for the O. T. I. This O.

T. I. difference has a plus value when the 24-hour kill for the sample is greater.

The tests were made with samples of petroleum distillate solutions containing 300 mg. of the product and 30 mg. of pyrethrins per 100 cc. unless otherwise indicated.

Examples 1 to 3

This product was made by heating together 38 g. of methoxyethyl alcohol, 81 g. of safrole, 31 g. of paraformaldehyde and 3 g. of toluene sulfonic acid (TSA).

| Example | Catalyzer | Time | Temperature | Yield |
|---|---|---|---|---|
| | | Hours | °C. | Grams |
| 1 | 3 g. TSA | 24 | 75 | 128 |
| 2 | do | 7 | 92–95 | 124.5 |
| 3 | do | 22 | 85 | 137 |

| Example | Knockdown in 10 minutes | Kill in 24 Hrs. | O. T. I. Difference |
|---|---|---|---|
| | Per cent | Per cent | |
| 1 | 90 | 59 | +7 |
| 2 | 91 | 64 | +14 |
| 3 | 90 | 71 | +26 |

*Examples 1 and 2.*—The product was dissolved in benzene and washed free from acid. The benzene solution was clarified, filtered, and distilled at reduced pressure to remove benzene by heating in a water bath at 50° C. The product was heated to constant weight.

*Example 3.*—The methoxyethyl alcohol, paraformaldehyde and toluenesulfonic acid were heated together to 85° C. in about 10 minutes, at which time the paraformaldehyde was nearly all dissolved. The safrole was added with stirring during about 50 minutes. After the mixture was heated for 22 hours the flask was opened and water was evaporated during about one hour. The acid in the product was not neutralized, but it may be neutralized for some uses.

A petroleum distillate solution containing 300 mg. of the product per 100 cc. gave 41% knockdown in 10 minutes and 10% kill in 24 hours. A petroleum distillate containing 30 mg. of pyrethrins per 100 cc. gave 66% knockdown in 10 minutes and 14% kill in 24 hours.

Examples 4 to 6

This product was made by heating together 45 g. of ethoxyethyl alcohol, 81 g. of safrole, 31 g. of paraformaldehyde and 3 g. of toluenesulfonic acid (TSA).

| Example | Catalyst | Time | Temperature | Yield |
|---|---|---|---|---|
| | | Hours | °C. | Grams |
| 4 | 3 g. TSA | 6 | 83 | 138 |
| 5 | do | 23 | 81–84 | 122 |
| 6 | do | 22 | 85 | 141 |

| Example | Knockdown in 10 minutes | Kill in 24 Hrs. | O. T. I. Difference |
|---|---|---|---|
| | Per cent | Per cent | |
| 4 | 90 | 48 | +11 |
| 5 | 91 | 54 | +9 |
| 6 | 91 | 67 | +24 |

*Example 4 and 5.*—The product was dissolved in benzene and washed free from acid. The benzene solution was clarified, filtered and distilled at reduced pressure to remove benzene by heating in a water bath at 50° C. The product was heated to constant weight.

*Example 6.*—The ethoxyethyl alcohol, paraformaldehyde and toluenesulfonic acid were heated together to 85° C. in about 10 minutes, at which time the paraformaldehyde was nearly all dissolved. The safrole was added with stirring during about one hour. After the mixture was heated for 22 hours the flask was opened and the water was evaporated during about one hour. The acid in the product was not neutralized, but it may be neutralized for some uses.

A petroleum distillate solution containing 300 mg. of the product per 100 cc. gave 45% knockdown in 10 minutes and 17% kill in 24 hours. A petroleum distillate solution containing 30 mg. of pyrethrins per 100 cc. gave 66% knockdown in 10 minutes and 14% kill in 24 hours.

Examples 7 to 12, inclusive

This product was made by heating together 59 g. of n-butoxyethyl alcohol, 81 g. of safrole, 30 or 31 g. of paraformaldehyde and 1 to 4 g. of toluenesulfonic acid (TSA).

| Example | Catalyst | Time | Temperature | Yield |
|---|---|---|---|---|
| | | Hours | °C. | Grams |
| 7 | 1 g. TSA | 62 | 85 | 153 |
| 8 | 2 g. TSA | 40 | 82–86 | 151 |
| 9 | 3 g. TSA | 63 | 83–88 | 153 |
| 10 | 4 g. TSA | 46 | 81–88 | 156 |
| 11 | 3 g. TSA | 7½ | 85 | 160 |
| 12 | 3 g. TSA | About 24 | 85 | 155 |

| Example | Knockdown in 10 minutes | Kill in 24 Hrs. | O. T. I. Difference |
|---|---|---|---|
| | Percent | Percent | |
| 7 | 92 | 69 | +28 |
| 8 | 98 | 70 | +33 |
| 9 | 95 | 76 | +34 |
| 10 | 93 | 80 | +30 |
| 11 | 92 | 59 | +14 |
| 12 | 85 | 67 | +20 |

*Examples 7, 8 and 9.*—There was added 100 cc. of benzene at the start. The water formed was boiled out by the benzene into a receiver. The benzene solution was cooled, washed free from acid, clarified, filtered and distilled at reduced pressure to remove benzene. The product was heated to constant weight.

*Example 10.*—There was added 25 cc. of benzene at the start. At end of heating the product was cooled and the benzene solution was washed free from acid and handled further as above.

*Example 11.*—The ingredients were heated together. Then the product was dissolved in benzene, washed free from acid and handled further as above.

*Example 12.*—The alcohol, paraformaldehyde and acid were heated to 85° C. The safrole was added with stirring during about one hour. The mixture was heated for 22 hours at 85° C. The flask was then opened and water was evaporated during about 1⅔ hours. The acid in the product was not neutralized, but it may be neutralized for some uses. All products were brown, mobile oils soluble in petroleum distillate.

A petroleum distillate solution containing 300 mg. of product per 100 cc. gave 46% knockdown in 10 minutes and 13% kill in 24 hours. A petroleum distillate solution containing 30 mg. of pyrethrins per 100 cc. gave 66% knockdown in 10 minutes and 14% kill in 24 hours.

Examples 13 to 15

This product was made by heating together 60 g. methoxyethoxyethyl alcohol, 81 g. safrole, 31 g. paraformaldehyde and 3 g. of toluenesulfonic acid (TSA).

| Example | Catalyst | Time | Temperature | Yield |
|---|---|---|---|---|
|  |  | Hours | °C. | Grams |
| 13 | 3 g. TSA | 7½ | 85 | 148 |
| 14 | do | 23 | 85 | 147 |
| 15 | do | 22 | 85 | 156 |

| Example | Knockdown in 10 minutes | Kill in 24 Hrs. | O. T. I. Difference |
|---|---|---|---|
|  | Per cent | Per cent |  |
| 13 | 87 | 50 | +5 |
| 14 | 91 | 48 | +5 |
| 15 | 94 | 68 | +15 |

*Examples 13 and 14.*—The ingredients were heated together at the temperature and for the time stated. The product was cooled, dissolved in benzene, washed free from acid, clarified, filtered and distilled at reduced pressure to remove benzene, and heated further to constant weight at 50° C.

*Example 15.*—The alcohol, paraformaldehyde and acid were heated to 85° C. and the safrole was added with stirring during about one hour. After heating about 22 hours the flask was opened and water was evaporated during 1⅔ hours. The acid in the product was not neutralized, but it may be neutralized for some uses.

A petroleum distillate solution containing 300 mg. of product per 100 cc. gave 43% knockdown in 10 minutes and 16% kill in 24 hours. A petroleum distillate solution containing 30 mg. of pyrethrins per 100 cc. gave 66% knockdown in 10 minutes and 14% kill in 24 hours.

Examples 16 to 18

This product was made by heating together 67 g. of ethoxyethoxyethyl alcohol, 81 g. of safrole, 31 g. of paraformaldehyde and 3 g. of toluenesulfonic acid (TSA).

| Example | Catalyst | Time | Temperature | Yield |
|---|---|---|---|---|
|  |  | Hours | °C. | Grams |
| 16 | 3 g. TSA | 7½ | 85 | 163 |
| 17 | do | 24 | 85 | 156.5 |
| 18 | do | 22¼ | 85 | 167 |

| Example | Knockdown in 10 minutes | Kill in 24 Hrs. | O. T. I. Difference |
|---|---|---|---|
|  | Per cent | Per cent |  |
| 16 | 93 | 49 | +10 |
| 17 | 95 | 76 | +26 |
| 18 | 92 | 63 | +9 |

*Examples 16 and 17.*—The ingredients were heated together at the temperature and for the time stated. The product was cooled, dissolved in benzene, washed free from acid, clarified, filtered and distilled at reduced pressure to remove benzene, and heated further to constant weight at 50° C. In Example 17 there was used 34 g. paraformaldehyde.

*Example 18.*—The alcohol, paraformaldehyde and acid were heated to 85° C. and the safrole was added with stirring about one hour. After heating 22¼ hours the flask was opened and water was evaporated during 1⅔ hours. The acid in the product was not neutralized, but it may be neutralized for some uses.

A petroleum distillate solution containing 300 mg. of product per 100 cc. gave 36% knockdown in 10 minutes and 14% kill in 24 hours. A petroleum distillate solution containing 30 mg. of pyrethrins per 100 cc. gave 66% knockdown in 10 minutes and 14% kill in 24 hours.

Examples 19 to 27

The following tests were made by heating together 81 g. of butoxyethoxyethyl alcohol, 81 g. of safrole, 31 g. of paraformaldehyde and the stated amount of arylsulfonic acid.

| Example | Catalyst | Time | Temperature | Yield |
|---|---|---|---|---|
|  |  | Hours | °C. | Grams. |
| 19 | 3 g. TSA | 24 | 60 | 177 |
| 20 | 1 g. TSA | 24 | 85 | 181 |
| 21 | 2 g. TSA | 24 | 85 | 183 |
| 22 | 5 g. TSA | 8 | 85 | 181.5 |
| 23 | do | 14 | 85 | 183 |
| 24 | 4 g. TSA | 24 | 85 | 185 |
| 25 | do | 46.5 | 85–89 | 179 |
| 26 | 3 g. BSA | 24 | 85 | 176.5 |
| 27 | 4 g. NSA | 24 | 85 | 175.5 |

| Example | Knockdown in 10 minutes | Kill in 24 Hrs. | O. T. I. Difference |
|---|---|---|---|
|  | Per cent | Per cent |  |
| 19 | 91 | 47 | +1 |
| 20 | 94 | 60 | +20 |
| 21 | 94 | 66 | +16 |
| 22 | 91 | 70 | +28 |
| 23 | 94 | 81 | +30 |
| 24 | 90 | 72 | +36 |
| 25 | 97 | 87 | +36 |
| 26 | 98 | 87 | +49 |
| 27 | 99 | 76 | +22 |

TSA is toluenesulfonic acid.
BSA is benzenesulfonic acid.
NSA is naphthalene beta-sulfonic acid.

*Example 25.*—A petroleum distillate solution containing 300 mg. of the product and 60 mg. of pyrethrins per 100 cc. gave 98% knockdown in 10 minutes and 91% kill in 24 hours. The O. T. I. difference was +53. A petroleum distillate solution containing 60 mg. pyrethrins per 100 cc. gives about 23% kill in 24 hours. See below for test with solution of 300 mg. of product.

*Example 19.*—When the test was stopped heating there was a small amount of undissolved paraformaldehyde on the flask and in the liquid product. The product was dissolved in benzene and the benzene solution was decanted from the solid which on being dried weighed 6 g. The benzene solution was washed free from acid, clarified, filtered and distilled at reduced pressure to remove benzene. The product was heated to constant weight. The results at 60° C. were not so good as at a higher temperature.

*Examples 20, 21, 22, 23, 25, 26 and 27.*—The products were dissolved in benzene and washed free from acid. The benzene solution was clarified, filtered and distilled at reduced pressure to remove benzene. The product was heated to constant weight.

*Example 24.*—The butoxyethoxyethyl alcohol, paraformaldehyde and toluenesulfonic acid were heated together to 85° C. and the safrole was added with stirring during about one hour. The reaction mixture was heated for 22 hours. Then the flask was opened to evaporate water during another hour. The acid in the product was not neutralized, but it may be neutralized for some uses.

A petroleum distillate solution containing 300 mg. of product per 100 cc. gave 35% knockdown in 10 minutes and 20% kill in 24 hours. A petroleum distillate solution containing 30 mg. of pyrethrins per 100 cc. gave 66% knockdown in 10 minutes and 14% kill in 24 hours.

In the reaction mixtures of Examples 1 to 27 the several alcohols and paraformaldehyde possibly react to yield temporarily hemiacetals and formals. In order to determine whether the formals would yield products that were insecticides, the following tests were made from the formals of two of the alcohols used above.

Examples 28 and 29

This product was made by heating together 41 g. of dimethoxyethyl formal, 23.5 g. of paraformaldehyde (which are equivalent to 38 g. of methoxyethyl alcohol and 31 g. of paraformaldehyde), 81 g. of safrole and 3 g. of toluenesulfonic acid (TSA). There was added 2 g. of water to start the hydrolysis of the formal to the hemiacetal and the alcohol.

| Example | Catalyst | Time | Temperature | Yield |
|---|---|---|---|---|
|  |  | Hours | °C. | Grams |
| 28 | 3 g. TSA | 23 | 85 | 124.5 |
| 29 | do | 22 | 84–88 | 134.5 |

| Example | Knockdown in 10 minutes | Kill in 24 Hrs. | O. T. I. Difference |
|---|---|---|---|
|  | Per cent | Per cent |  |
| 28 | 90 | 61 | +25 |
| 29 | 90 | 71 | +35 |

*Example 28.*—The product was dissolved in benzene and washed free from acid. The benzene solution was clarified, filtered, and distilled at reduced pressure in a water bath at 50° C. The product was heated to constant weight.

*Example 29.*—The product was dissolved in benzene (150 cc.) and boiled to distill water into a receiver during about 50 minutes. The benzene solution was washed free from acid and further handled as in Example 28.

These products are considered to be like those in Examples 1 to 3.

Example 30

This product was made by heating together 62 g. of dibutoxy ethyl formal, 23.5 g. of paraformaldehyde (which are equivalent to 59 g. of butoxyethyl alcohol and 31 g. of paraformaldehyde), 81 g. of safrole and 4 g. of toluenesulfonic acid (TSA). There was added 4.5 g. H₂O.

| Example | Catalyst | Time | Temperature | Yield |
|---|---|---|---|---|
|  |  | Hours | °C. | Grams |
| 30 | 4 g. TSA | 24 | 82–86 | 159 |

| Example | Knockdown in 10 minutes | Kill in 24 Hrs. | O. T. I. Difference |
|---|---|---|---|
|  | Per cent | Per cent |  |
| 30 | 92 | 75 | +22 |

The product was dissolved in benzene and washed free from acid. The benzene solution was handled further as in Example 28.

This product was considered to be like those in Examples 7 to 12.

When safrole and paraformaldehyde are heated together with toluenesulfonic acid there is formed a product which was made by heating together 162 g. of safrole, 47 g. of paraformaldehyde and 3 g. of toluenesulfonic acid. As the temperature was raised to 60° C., the reaction gave rapid evolution of heat. In about an hour most of the paraformaldehyde had dissolved. Then the mixture was heated at 85–86° C. for 24 hours. Yield 191 g. A petroleum distillate solution containing 300 mg. of product and 30 mg. of pyrethrins gave 83% knockdown in 10 minutes and 60% kill in 24 hours. The O. T. I. difference was +22.

Example 31 and 32

This product was made by heating together 94.5 or 95.5 g. of the reaction product derived from safrole and paraformaldehyde above, 41 g. dimethoxyethyl formal, 3 g. of toluenesulfonic acid and 9 g. of water.

| Example | Catalyst | Time | Temperature | Yield |
|---|---|---|---|---|
|  |  | Hours | °C. | Grams |
| 31 | 3 g. TSA | 24 | 85 | 132 |
| 32 | do | 24 | 85 | 126 |

| Example | Knockdown in 10 minutes | Kill in 24 Hrs. | O. T. I. Difference |
|---|---|---|---|
|  | Per cent | Per cent |  |
| 31 | 91 | 63 | +13 |
| 32 | 90 | 62 | +9 |

*Examples 31 and 32.*—Benzene (150 cc.) was added to the product and water was boiled out. The benzene solution was washed free from acid and handled further as in Example 28. This product was considered to be like Examples 1 to 3.

Examples 33 and 34

This product was made by heating together about 95 g. of the reaction product derived from safrole and paraformaldehyde above, 84 g. of dibutoxyethoxyethyl formal, 4 g. of toluenesulfonic acid and 9 g. of water. In the following table the first test for each example was made on the mixture after heating and the second test was made before heating the same percentage composition.

| Example | Catalyst | Time | Temperature | Yield |
|---|---|---|---|---|
|  |  | Hours | °C. | Grams |
| 33 | 4 g. TSA | 23 | 84–89 | 176 |
| 34 | do | 24 | 85 | 180.5 |

| Example | Knockdown in 10 minutes | Kill in 24 Hrs. | O. T. I. Difference |
|---|---|---|---|
|  | Per cent | Per cent |  |
| 33 | 94 | 75 | +40 |
|  | 87 | 59 | +14 |
| 34 | 91 | 69 | +20 |
|  | 78 | 50 | +8 |

After the period of heating the flask was opened to evaporate water.

There is observed to be an important increase in reacting the above ingredients. The dibutoxyethoxyethyl formal has little, if any, insecticidal value and the value of the reaction product made from safrole and paraformaldehyde is only fair (see above). This product is considered to be like Examples 19 to 27.

A concentrate was prepared from the product of Example 22, 10% pyrethrin extract and petroleum distillate in such proportions that the concentrate contained by weight of each 40% of the product of Example 22, 5% of pyrethrins and 55% of mineral hydrocarbons.

This concentrate was mixed at the rate of 5% with 15% mineral hydrocarbons and 80% of a mixture of 50% each of Freon 11 and Freon 12. The composition was packaged in a container with a suitable release valve under about 38 lbs. pressure. This package is commonly called an "aerosol bomb." The composition was tested in a 6 ft. cube chamber at the rate of 1.2 g. per test. The average of three tests gave 86% knockdown in 15 minutes, 83% kill in 24 hours. The percentage of paralyzed flies killed was 98%.

I claim:

1. Method for the preparation of an organic chemical product which comprises reacting at elevated temperature one mol of safrol, substantially one mol of at least one alcohol of the generic formula $RO(CH_2CH_2O)_nH$, in which R is an alkyl radical having from one to four carbon atoms and $n$ is an integer from one to two, and substantially two mols of formaldehyde, the reaction mixture containing as a catalyst at least one strong, non-volatile acid.

2. Method as in claim 1, in which $n$ is one.

3. Method as in claim 1, in which $n$ is one and R is the n-butyl radical.

4. Method as in claim 1, in which $n$ is two.

5. Method as in claim 1, in which $n$ is two and R is the n-butyl radical.

6. The new organic chemical product having the structural formula:

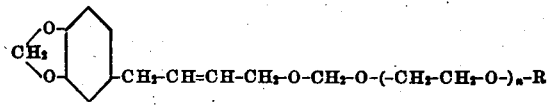

in which R is an alkyl radical having from one to four carbon atoms and $n$ is an integer from one to two.

7. The new organic chemical product having the structural formula:

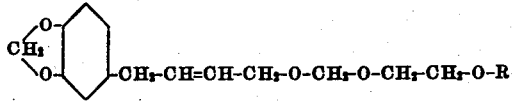

in which R is an alkyl radical having from one to four carbon atoms.

8. A new organic chemical product having the structural formula:

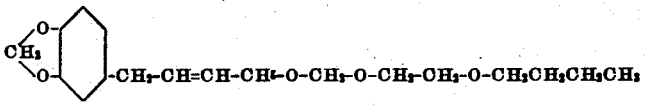

9. A new organic chemical product having the structural formula:

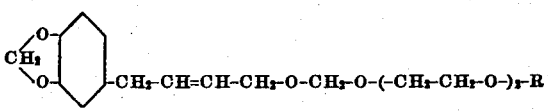

in which R is an alkyl radical having from one to four carbon atoms.

10. A new organic chemical product having the structural formula:

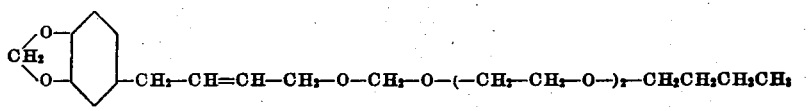

11. An insecticidal composition comprising pyrethrins and as a synergist therefor the product of claim 6.

12. An insecticidal composition comprising pyrethrins and as a synergist therefor the product of claim 7.

13. An insecticidal composition comprising pyrethrins and as a synergist therefor the product of claim 8.

14. An insecticidal composition comprising pyrethrins and as a synergist therefor the product of claim 9.

15. An insecticidal composition comprising pyrethrins and as a synergist therefor the product of claim 10.

OSCAR F. HEDENBURG.

REFERENCES CITED

The following references are of record in the file of this patent:

UNITED STATES PATENTS

| Number | Name | Date |
| --- | --- | --- |
| 2,430,116 | Holmes et al. | Nov. 4, 1947 |
| 2,433,491 | Synerholm | Dec. 30, 1947 |
| 2,442,555 | Synerholm | June 1, 1948 |
| 2,456,316 | Prill | Dec. 14, 1948 |
| 2,457,957 | Wachs | Jan. 4, 1949 |
| 2,485,600 | Hedenburg | Oct. 25, 1949 |
| 2,485,681 | Wachs | Oct. 25, 1949 |